United States Patent
Kim et al.

(10) Patent No.: US 10,209,803 B2
(45) Date of Patent: Feb. 19, 2019

(54) TOUCH SENSOR AND LIQUID CRYSTAL DISPLAY INCLUDING THE SAME

(71) Applicant: Samsung Display Co., Ltd., Yongin-si, Gyeonggi-do (KR)

(72) Inventors: Sang Mi Kim, Yongin-si (KR); Joon Chul Goh, Yongin-si (KR); Kyoung Ho Lim, Yongin-si (KR)

(73) Assignee: Samsung Display Co., Ltd. (KR)

( * ) Notice: Subject to any disclaimer, the term of this patent is extended or adjusted under 35 U.S.C. 154(b) by 143 days.

(21) Appl. No.: 15/163,210

(22) Filed: May 24, 2016

(65) Prior Publication Data

US 2017/0108973 A1    Apr. 20, 2017

(30) Foreign Application Priority Data

Oct. 20, 2015    (KR) ........................ 10-2015-0146036

(51) Int. Cl.
| | |
|---|---|
| *G06F 3/041* | (2006.01) |
| *G06F 3/044* | (2006.01) |
| *G02F 1/1333* | (2006.01) |
| *G02F 1/1335* | (2006.01) |
| *G02F 1/1339* | (2006.01) |
| *G02F 1/1343* | (2006.01) |

(52) U.S. Cl.
CPC ........ *G06F 3/0414* (2013.01); *G02F 1/13338* (2013.01); *G02F 1/13394* (2013.01); *G02F 1/133512* (2013.01); *G02F 1/133514* (2013.01); *G02F 1/134309* (2013.01); *G06F 3/044* (2013.01); *G06F 3/0412* (2013.01); *G06F 3/0416* (2013.01); *G02F 2001/133394* (2013.01); *G06F 2203/04105* (2013.01)

(58) Field of Classification Search
None
See application file for complete search history.

(56) References Cited

U.S. PATENT DOCUMENTS

| | | | |
|---|---|---|---|
| 7,864,503 | B2 | 1/2011 | Chang |
| 8,508,494 | B2 | 8/2013 | Moore |
| 9,018,030 | B2 | 4/2015 | Li et al. |
| 9,690,408 | B1 * | 6/2017 | Krah ..................... G06F 3/0412 |
| 2009/0267916 | A1 | 10/2009 | Hotelling |
| 2010/0156818 | A1 | 6/2010 | Burrough et al. |
| 2012/0013573 | A1 | 1/2012 | Liu et al. |

(Continued)

FOREIGN PATENT DOCUMENTS

| | | |
|---|---|---|
| KR | 10-2014-0078456 A | 6/2014 |
| KR | 10-1439718 B1 | 9/2014 |

(Continued)

*Primary Examiner* — Amr Awad
*Assistant Examiner* — Andre Matthews
(74) *Attorney, Agent, or Firm* — Innovation Counsel LLP

(57) ABSTRACT

There are provided a touch sensor and a liquid crystal display including the same. A touch sensor includes a plurality of driving electrodes, a plurality of sensing electrodes intersecting the driving electrodes, a plurality of piezoelectric materials disposed between the driving electrodes and the sensing electrodes at intersection points of the driving electrodes and the sensing electrodes, and a touch controller for detecting a touch position and a touch pressure by using sensing signals output from the sensing electrodes.

15 Claims, 5 Drawing Sheets

(56) References Cited

U.S. PATENT DOCUMENTS

| | | | |
|---|---|---|---|
| 2014/0085551 A1* | 3/2014 | Koo | G06F 3/041 |
| | | | 349/12 |
| 2014/0247231 A1* | 9/2014 | Lin | G06F 3/0414 |
| | | | 345/173 |
| 2014/0362000 A1* | 12/2014 | Seo | G02F 1/13394 |
| | | | 345/173 |
| 2016/0274712 A1* | 9/2016 | Liu | G06F 3/0412 |

FOREIGN PATENT DOCUMENTS

| KR | 10-1482022 B1 | 1/2015 |
|---|---|---|
| KR | 10-2015-0023890 A | 3/2015 |

\* cited by examiner

TOUCH SENSOR AND LIQUID CRYSTAL DISPLAY INCLUDING THE SAME

RELATED APPLICATIONS

This application claims priority to and the benefit of Korean Patent Application No. 10-2015-0146036, filed on Oct. 20, 2015, in the Korean Intellectual Property Office, the entire contents of which are incorporated herein by reference in their entirety.

BACKGROUND

1. Field

An aspect of the present disclosure relates to a touch sensor and a liquid crystal display including the same.

2. Description of the Related Art

As interest in information displays and demand for portable information media increases, research and commercialization on display devices replacing cathode ray tubes (CRTs) that are existing display devices have recently been actively conducted.

In particular, a liquid crystal display (LCD) is a device that displays an image using optical anisotropy of liquid crystals, and is widely being applied to TVs, notebook computers, monitors, tablet computers, cellular phones, and the like because the LCD has an excellent resolution, color rendering capability, picture quality, and the like.

Recently, a touch sensor capable of sensing a user's touch has been embedded in the LCD, so that the user can more conveniently use the LCD.

Accordingly, a conventional touch sensor merely performed a function of detecting a touch position, and does not detect a user's touch pressure. In addition, a separate pressure sensor should be installed in the touch sensor so as to detect a touch pressure.

SUMMARY

Embodiments provide a touch sensor and a liquid crystal display including the same, which can detect not only a user's touch position but also a touch pressure.

Technical objects to be achieved in the present disclosure are not limited to those described above, and other technical objects not described herein will be apparently understood by those skilled in the art from the disclosure of the present disclosure.

According to an aspect of the present disclosure, there is provided a touch sensor including: a plurality of driving electrodes; a plurality of sensing electrodes disposed to intersect the driving electrodes; a plurality of piezoelectric materials disposed between the driving electrodes and the sensing electrodes at intersection points of the driving electrodes and the sensing electrodes; and a touch controller configured to detect a touch position and a touch pressure by using sensing signals output from the sensing electrodes.

The touch controller may include a touch position detector configured to detect the touch position by using alternating current (AC) components of the sensing signals; and a touch pressure detector configured to detect the touch pressure by using direct current (DC) components of the sensing signals.

The touch controller may further include a plurality of AC bypass capacitors disposed between the sensing electrodes and the touch position detector, the plurality of AC bypass capacitors selectively transmitting the AC components of the sensing signals to the touch position detector.

The touch pressure detector may include an analog-digital converter (ADC) receiving the DC components of the sensing signal and configured to convert the DC components of the sensing signals into digital data; and a converting unit connected to the ADC and configured to convert the digital data output from the ADC into touch pressure information.

The plurality of piezoelectric materials may be disposed on the plurality of column spacers, respectively.

The plurality of piezoelectric materials and the plurality of column spacers may be completely overlap in a plan view.

The touch controller may further include a driving signal supply unit configured to supply driving signals to the driving electrodes.

According to an aspect of the present disclosure, there is provided a liquid crystal display, including: a first substrate and a second substrate opposite to each other; a plurality of driving electrodes formed on the first substrate; a black matrix formed under the second substrate; a plurality of column spacers disposed under the black matrix, the plurality of column spacers extending toward the first substrate; a plurality of sensing electrodes formed over the column spacers and the black matrix, the plurality of sensing electrodes intersecting the driving electrodes; a plurality of piezoelectric materials respectively disposed between the driving electrodes and the sensing electrodes at intersection points of the driving electrodes and the sensing electrodes; and a touch controller configured to detect a touch position and a touch pressure by using sensing signals output from the sensing electrodes.

The plurality of driving electrodes may overlap the black matrix.

The liquid crystal display may further include a liquid crystal layer disposed between the first substrate and the second substrate.

The touch controller may include a touch position detector configured to detect the touch position by using AC components of the sensing signals; and a touch pressure detector configured to detect the touch pressure by using DC components of the sensing signals.

The touch controller may further include a plurality of AC bypass capacitors disposed between the sensing electrodes and the touch position detector, the plurality of AC bypass capacitors selectively transmitting the AC components of the sensing signals to the touch position detector.

The touch pressure detector may include an ADC receiving the DC components of the sensing signal and configured to convert the DC components of the sensing signals into digital data; and a converting unit connected to the ADC and configured to convert the digital data output from the ADC into touch pressure information.

The touch controller may further include a driving signal supply unit configured to supply driving signals to the driving electrodes.

As described above, according to the present disclosure, it is possible to provide a touch sensor and a liquid crystal display including the same, which can detect not only a user's touch position but also a touch pressure.

Also, according to the present disclosure, it is possible to provide a liquid crystal display capable of detecting a touch pressure by using the existing column spacers.

The effects of the present disclosure are not limited to the effects described above, and the other effects not stated in the above will be clearly understood by those skilled in the art from the claims.

BRIEF DESCRIPTION OF THE DRAWINGS

Example embodiments will now be described more fully hereinafter with reference to the accompanying drawings;

however, they may be embodied in different forms and should not be construed as limited to the embodiments set forth herein. Rather, these embodiments are provided so that this disclosure will be thorough and complete, and will fully convey the scope of the example embodiments to those skilled in the art.

Figure 1:
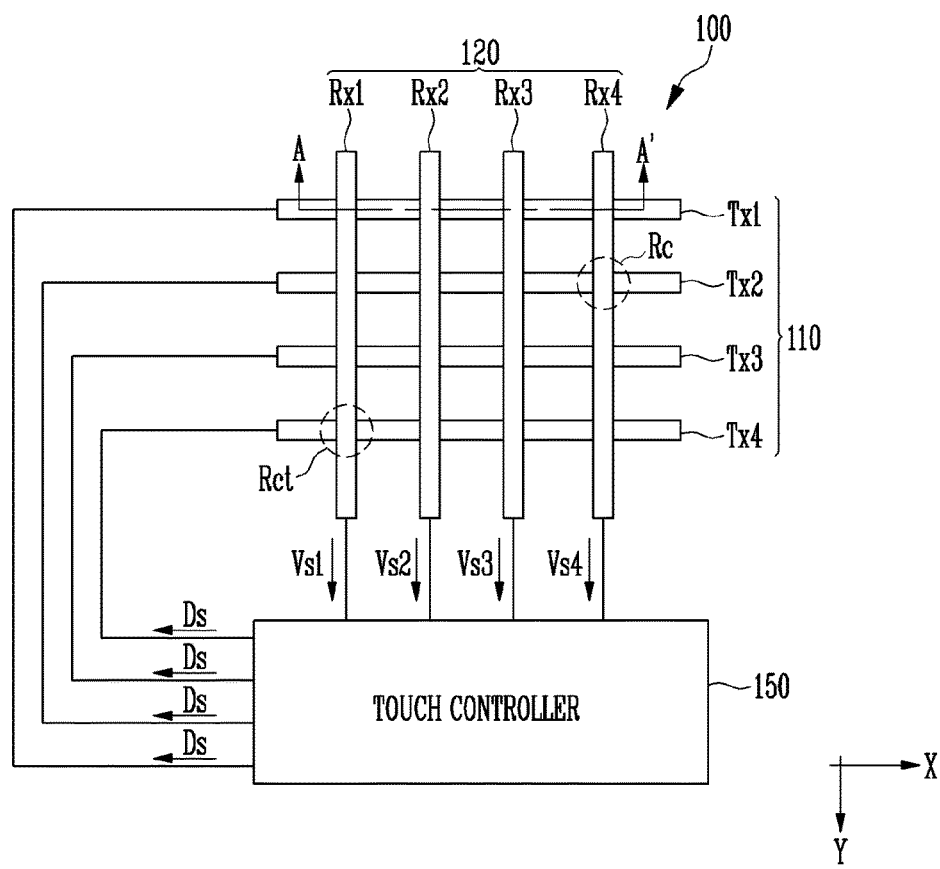

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 1 is a diagram showing a touch sensor according to an embodiment of the present disclosure.

Figure 2:
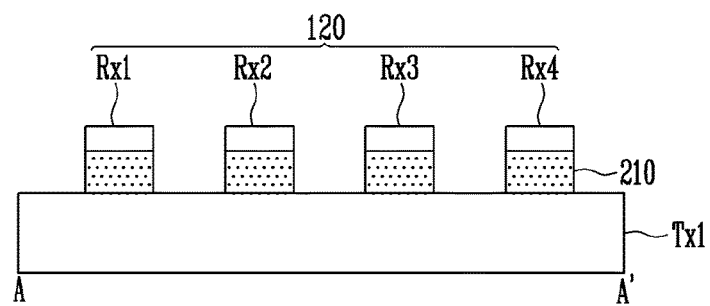

FIG. 2 is a diagram showing a section of the touch sensor shown in FIG. 1.

Figure 3:
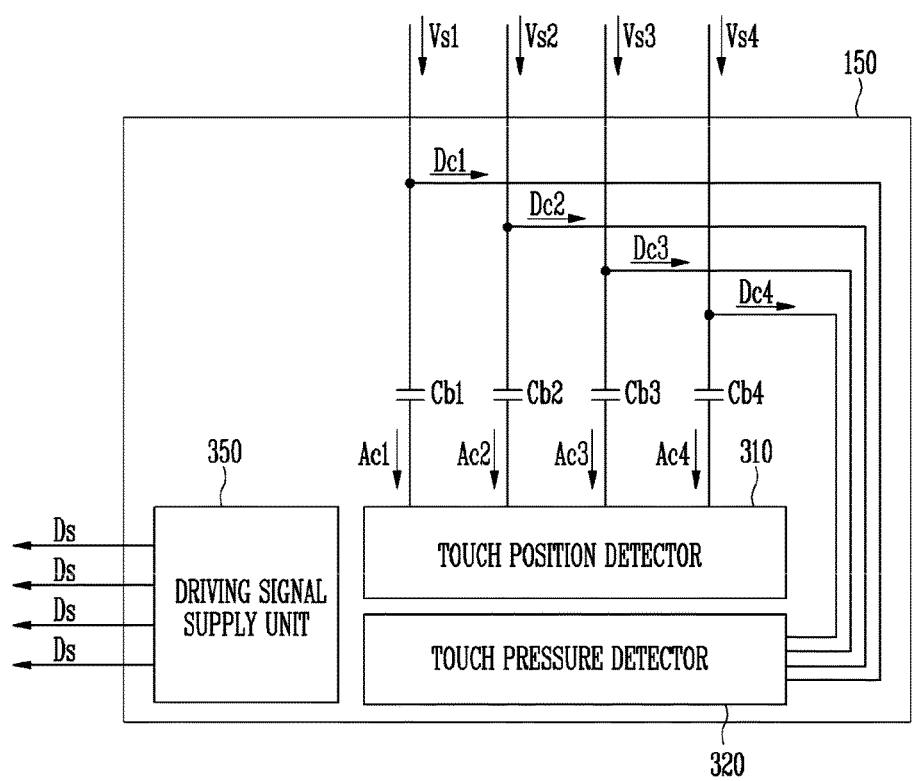

FIG. 3 is a diagram showing a touch controller according to an embodiment of the present disclosure.

Figure 4A:
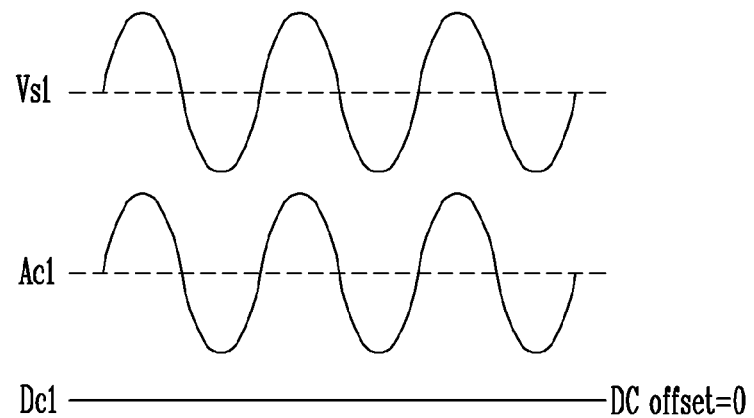
Figure 4B:
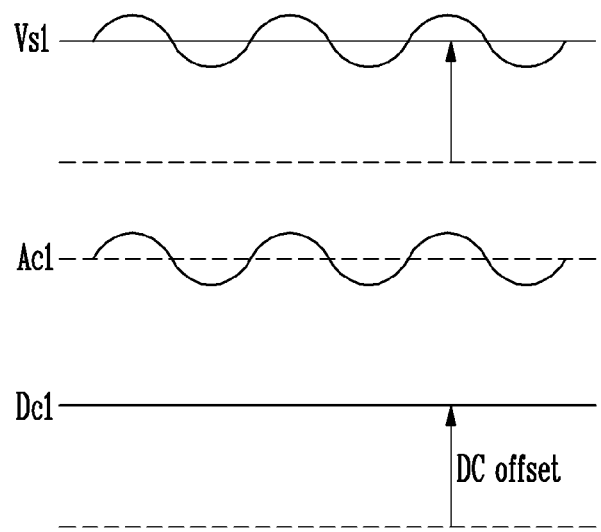

FIGS. 4A and 4B are waveform diagrams showing a sensing signal according to an embodiment of the present disclosure.

Figure 5:
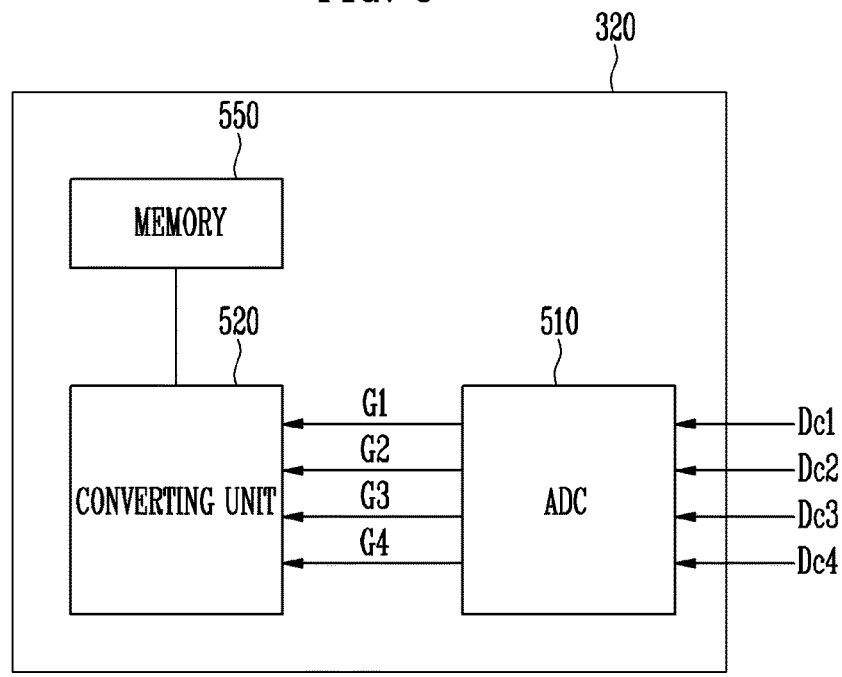

FIG. 5 is a diagram showing a touch pressure detector according to an embodiment of the present disclosure.

Figure 6:
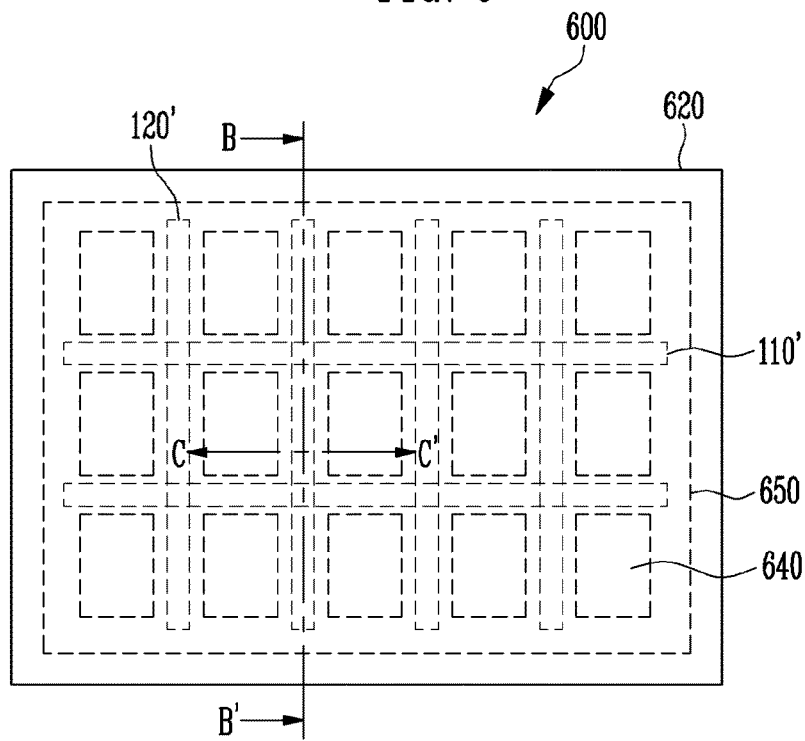

FIG. 6 is a diagram showing a liquid crystal display according to an embodiment of the present disclosure.

Figure 7:
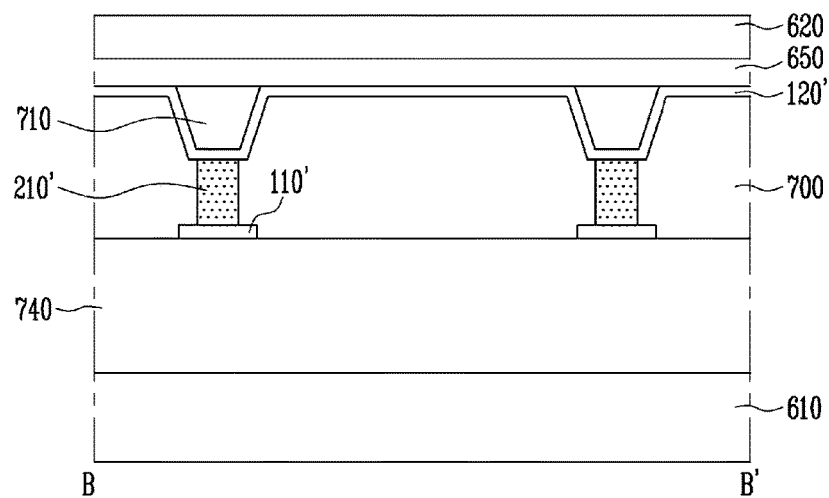
Figure 8:
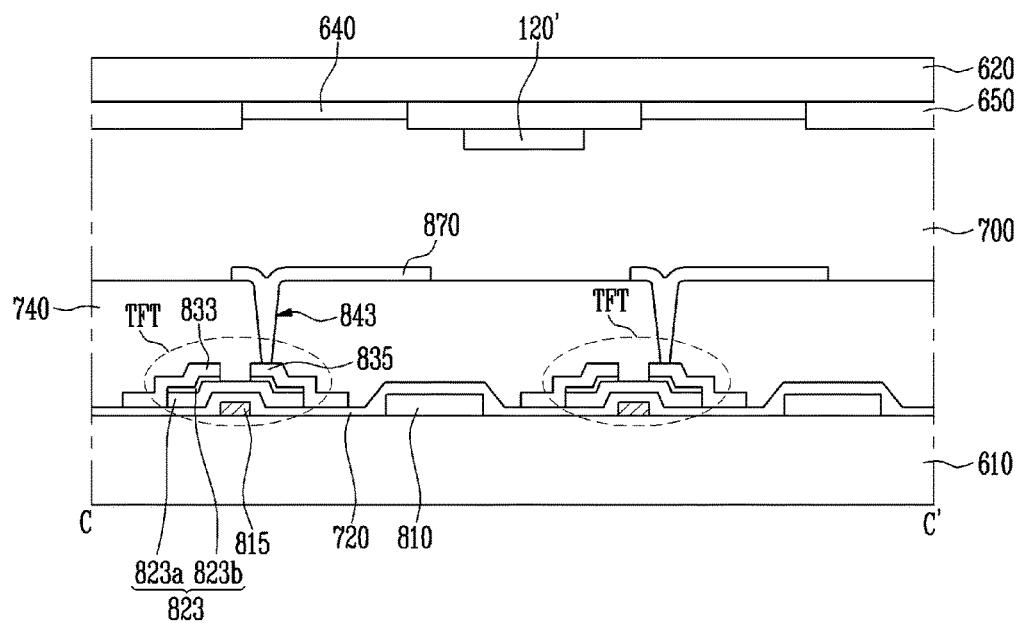

FIGS. 7 and 8 are diagrams showing sections of the liquid crystal display shown in FIG. 6.

DETAILED DESCRIPTION

Hereinafter, exemplary embodiments of the present disclosure will be described in detail with reference to the accompanying drawings. However, the present disclosure is not limited to the embodiments but may be implemented into different forms. These embodiments are provided only for illustrative purposes and for full understanding of the scope of the present disclosure by those skilled in the art. Like reference numerals indicate like elements throughout the specification and drawings.

Hereinafter, a touch sensor and a liquid crystal display device including the same according to embodiments of the present disclosure will be described with reference to the accompanying drawings.

FIG. 1 is a diagram showing a touch sensor according to an embodiment of the present disclosure. FIG. 2 is a diagram showing a section of the touch sensor shown in FIG. 1. Particularly, a section of the touch sensor 100, taken along line A-A' of FIG. 1, is illustrated in FIG. 2.

Referring to FIGS. 1 and 2, the touch sensor 100 according to the embodiment of the present disclosure may include driving electrodes 110, sensing electrodes 120, piezoelectric materials 210, and a touch controller 150.

The driving electrodes 110 and the sensing electrodes 120 may be arranged to intersect each other.

The driving electrode 110 is formed along a first direction (e.g., an X-axis direction) and may be arranged in plurality along a second direction (e.g., a Y-axis direction) intersecting the first direction.

Also, the driving electrodes 110 may receive driving signals Ds from the touch controller 150.

For example, the driving electrodes 110 may include first to fourth driving electrodes Tx1 to Tx4. That is, a case where four driving electrodes Tx1 to Tx4 exist is illustrated in FIG. 1.

However, the number of the driving electrodes 110 is not limited thereto and may be variously changed.

The sensing electrodes 120 are arranged to be spaced apart from the driving electrodes 110, so that the driving electrodes 110 and the sensing electrodes 120 can be operated as a capacitive type touch sensor which uses a capacitance coupling to sense a touch event.

The sensing electrode 120 is formed along the second direction (e.g., the Y-axis direction) and may be arranged in plurality along the first direction (e.g., the X-axis direction).

The sensing electrodes 120 may output sensing signals Vs1 to Vs4 to the touch controller 150.

For example, the sensing electrodes 120 may include first to fourth sensing electrodes Rx1 to Rx4. That is, a case where four sensing electrodes Rx1 to Rx4 exist is illustrated in FIG. 1.

However, the number of the sensing electrodes 120 is not limited thereto and may be variously changed.

In FIG. 1, it is illustrated that the driving and sensing electrodes 110 and 120 are formed in a bar shape, the shape of the driving and sensing electrodes 110 and 120 may be variously changed.

In FIGS. 1 and 2, it is illustrated that the driving electrodes 110 are disposed under the sensing electrodes 120. However, it will be apparent that the driving electrodes 110 may be disposed over the sensing electrodes 120.

According to the above-described arrangement of the driving and sensing electrodes 110 and 120, mutual capacitances between the driving electrodes 110 and the sensing electrodes 120 are formed at points at which the driving electrodes 110 and the sensing electrodes 120 intersect each other, and intersection points Rc at which the mutual capacitances are formed may serve as sensing cells for implementing touch recognition, respectively.

Referring to FIGS. 1 and 2, the piezoelectric materials 210 may be disposed between the driving electrodes 110 and the sensing electrodes 120 at the intersection points Rc of the driving electrodes 110 and the sensing electrodes 120, respectively.

In this case, the piezoelectric materials 210 may be contacted with the driving electrodes 110 and the sensing electrodes 120, respectively. The piezoelectric materials 210 may be directly contacted with the driving electrodes 110 and the sensing electrodes 120, respectively.

The piezoelectric materials 210 are materials for generating a predetermined voltage corresponding to a pressure applied thereto and may be patterned in a specific form through a photolithography process or the like.

The touch controller 150 may detect a touch position and a touch pressure by using the sensing signals Vs1 to Vs4 output from the sensing electrodes 120.

For example, the touch controller 150 may detect a touch position by using alternating current (AC) components of the sensing signals Vs1 to Vs4, and detect a touch pressure by using direct current (DC) components of the sensing signals Vs1 to Vs4.

FIG. 3 is a diagram showing a touch controller according to an embodiment of the present disclosure.

Referring to FIG. 3, the touch controller 150 according to the embodiment of the present disclosure may include a touch position detector 310, a touch pressure detector 320, a driving signal supply unit 350, and AC bypass capacitors Cb1 to Cb4.

The touch position detector 310 may detect a touch position by using AC components Ac1 to Ac4 of the sensing signals Vs1 to Vs4 output from the sensing electrodes 120.

For example, when a user's touch is generated at a specific position, the mutual capacitance of an intersection point Rc adjacent to the specific position is changed. As a result, the AC component of the sensing signal output from the sensing electrode 120 related to the intersection point Rc is changed.

Thus, the touch position detector 310 can detect a touch position through amounts of changes in the AC components Ac1 to Ac4.

The touch pressure detector 320 may detect a touch pressure by using DC components Dc1 to Dc4 of the sensing signals Vs1 to Vs4 output from the sensing electrodes 120.

For example, when a user's touch is generated at a specific position, the piezoelectric material 210 at an intersection point Rc adjacent to the specific position is pressed to generate a predetermined voltage. Hence, the DC component of the sensing signal output from the sensing electrode 120 related to the intersection point Rc is changed.

Thus, the touch pressure detector 320 can detect a touch pressure through amount of changes in the DC components Dc1 to Dc4.

The AC bypass capacitors Cb1 to Cb4 are disposed between the sensing electrodes 120 and the touch position detector 310, and may transmit the AC components Ac1 to Ac4 of the sensing signals Vs1 to Vs4 to the touch position detector 310.

For example, a first bypass capacitor Cb1 may bypass an AC component Ac1 of a first sensing signal Vs1, a second bypass capacitor Cb2 may bypass an AC component Ac2 of a second sensing signal Vs2, a third bypass capacitor Cb3 may bypass an AC component Ac3 of a third sensing signal Vs3, and a fourth bypass capacitor Cb4 may bypass an AC component Ac4 of a fourth sensing signal Vs4.

In this case, DC components Dc1 to Dc4 of the sensing signals Vs1 to Vs4, which are not bypassed by the AC bypass capacitors Cb1 to Cb4, may be input to the touch pressure detector 320.

The driving signal supply unit 350 may supply driving signals Ds to the driving electrodes 110.

For example, the driving signal supply unit 350 may sequentially supply the driving signals Ds to the driving electrodes 110.

When the touch sensor 100 is employed in a display device, the driving signal supply unit 350 may supply the driving signals Ds during a touch driving period, and stop the supply of the driving signals Ds during an image display period.

FIGS. 4A and 4B are waveform diagrams showing a sensing signal according to an embodiment of the present disclosure. In FIGS. 4A and 4B, the first sensing signal Vs1 output from the first sensing electrode Rx1 is representatively illustrated, and the AC and DC components Ac1 and Dc1 of the first sensing signal Vs1 are also illustrated.

When assuming that a touch is generated at an intersection portion Rct of the fourth driving electrode Tx4 and the first sensing electrode Rx1 in FIG. 1, an operation of the touch sensor 100 will be described.

While the driving signal Ds is being sequentially supplied to the first driving electrode Tx1, the second driving electrode Tx2, and the third driving electrode Tx3, the first sensing signal Vs1 has a waveform shown in FIG. 4A due to influence of the driving signal Ds.

While the driving signal Ds is being supplied to the fourth driving electrode Tx4, mutual capacitance at the intersection point Rct is decreased by a user's touch, and simultaneously, a pressure is applied to the piezoelectric material 210 disposed at the intersection point Rct. Therefore, the first sensing signal Vs1 is changed as shown in FIG. 4B.

That is, as the mutual capacitance is decreased, the amplitude of the AC component Ac1 of the first sensing signal Vs1 is decreased, and the value of the DC component Dc1 of the first sensing signal Vs1 is increased by a voltage generated from the piezoelectric material 210.

Thus, the touch position detector 310 recognizes an amount of the change in the AC component Ac1 of the first sensing signal Vs1, to detect that the touch has generated at the specific intersection point Rct.

Also, the touch pressure detector 320 recognizes an amount (DC offset) of the change in the DC component Dc1 of the first sensing signal Vs1, to detect a pressure applied to the specific intersection point Rct.

That is, as the magnitude of a touch pressure increases, the amount (DC offset) of the change in the DC component Dc1 increases. Thus, the touch pressure detector 320 can estimate the magnitude of the touch pressure from the amount of the change (DC offset) in the DC component Dc1.

Meanwhile, any touch is not generated at the intersection points Rc related to the second sensing electrode Rx2, the third sensing electrode Rx3, and the fourth sensing electrode Rx4, and therefore, the second sensing signal Vs2, the third sensing signal Vs3, and the fourth sensing signal Vs4 all have the waveform shown in FIG. 4A.

Information on the touch position detected by the touch position detector 310 and information on the touch pressure detected by the touch pressure detector 320 may be transmitted to a timing controller (T-CON) or an application processor (AP).

FIG. 5 is a diagram showing a touch pressure detector according to an embodiment of the present disclosure.

Referring to FIG. 5, the touch pressure detector 320 according to the embodiment of the present disclosure may include an analog-digital converter (ADC) 510, a converting unit 520, and a memory 550.

The ADC 510 may receive DC components Dc1 to Dc4 of sensing signals Vs1 to Vs4, and convert the DC components Dc1 to Dc4 into digital data G1 to G4.

Since values of the DC components Dc1 to Dc4 are changed depending on the magnitude of a touch pressure, the digital data G1 to G4 may also be changed depending on the magnitude of the touch pressure.

The converting unit 520 may receive digital data G1 to G4 from the ADC 510, and convert the digital data G1 to G4 into touch pressure information. For example, the touch pressure information may include the magnitude of a touch pressure.

The memory 550 may store a look-up table including touch pressure information set for each digital data.

Thus, the converting unit 520 can convert the digital data G1 to G4 into the touch pressure information with reference to the look-up table stored in the memory 550.

FIG. 6 is a diagram showing a liquid crystal display according to an embodiment of the present disclosure. FIGS. 7 and 8 are diagrams showing sections of the liquid crystal display shown in FIG. 6. Particularly, a section of the liquid crystal display 600, taken along line B-B' of FIG. 6, is illustrated in FIG. 7, and a section of the liquid crystal display 600, taken along line C-C' of FIG. 6, is illustrated in FIG. 8.

Referring to FIGS. 6 to 8, the liquid crystal display 600 according to the embodiment of the present disclosure may include a touch sensor 100 described with reference to FIGS. 1 to 5.

Specifically, the liquid crystal display 600 according to the embodiment of the present disclosure may include driving electrodes 110', sensing electrodes 120', piezoelectric materials 210', a first substrate 610, a second substrate 620, a black matrix 650, and column spacers 710.

The liquid crystal display 600 according to the embodiment of the present disclosure may further include a touch controller 150 described above.

However, the configuration and operation of the touch controller 150 are the same as the above-described embodiment, and therefore, their descriptions will be omitted.

The driving electrodes 110', the sensing electrodes 120', and the piezoelectric materials 210', which are described herein, are components respectively corresponding to the driving electrodes 110, the sensing electrodes 120, and the piezoelectric materials 210, which are described above. The driving electrodes 110', the sensing electrodes 120', and the piezoelectric materials 210' may be embedded in the liquid crystal display 600 between the first substrate 610 and the second substrate 620 to operate as the touch sensor 100.

The first substrate 610 and the second substrate 620 may be disposed opposite to each other.

Also, a liquid crystal layer 700 may be interposed between the first substrate 610 and the second substrate 620.

A plurality of color filter patterns 640 and the black matrix 650 may be disposed under the second substrate 620.

The color filter patterns 640 may include red color filter patterns, green color filter patterns, and blue color filter patterns. The black matrix 650 may be formed to surround the color filter patterns 640. The black matrix has a matrix shape having openings in which the color filter patters 640 are disposed.

The column spacers 710 are used to maintain a gap between the first substrate 610 and the second substrate 620, and may be disposed under the black matrix 650 to extend toward the first substrate 610. The black matrix and the column spacers 710 may be form on the same layer and be formed of a same material through a same manufacturing process.

The sensing electrodes 120' may be disposed under the black matrix 650, so that a user cannot view the sensing electrodes 120'. For example, the sensing electrodes 120' may be formed over the column spacers 710 and the black matrix 650 which are disposed over the second substrate 620. The sensing electrodes 120' may be formed on a top surface of the column spacer 710 which faces a first substrate 610 and side surface of the column spacer 710.

The driving electrodes 110' may be disposed above the first substrate 610. In this case, the driving electrodes 110' may be disposed to overlap the black matrix 650, so that the user cannot view the driving electrodes 110'.

For example, the driving electrodes 110' may be disposed on the protective layer 740.

As described above, the driving electrodes 110' and the sensing electrodes 120' may be arranged to intersect each other.

The piezoelectric materials 210' may be disposed between the driving electrodes 110' and the sensing electrodes 120' at intersection points of the driving electrodes 110' and the sensing electrodes 120', respectively.

Thus, the driving electrodes 110', the sensing electrodes 120', and the piezoelectric materials 210' are arranged to overlap the column spacers 710 which exists in the liquid crystal display 600 in a plan view, so that it is possible to detect a touch position and a touch pressure while maintaining the gap between the substrates 610 and 620 as usual. The piezoelectric material and the column spacer completely overlap in a plan view.

The liquid crystal display 600 according to the embodiment of the present disclosure may further include components for displaying images.

For example, referring to FIG. 8, pixel transistors TFT, common electrodes 810, and pixel electrodes 870 may be additionally disposed on the first substrate 610.

Each of the pixel transistors TFT includes a gate electrode 815 connected to a gate line (not shown), a first electrode (e.g., a source electrode) 833, a second electrode (e.g., a drain electrode) 835, and a semiconductor layer 823 formed between the gate electrode 815 and the first and second electrodes 833 and 835. Here, the semiconductor layer 823 includes an active layer 823*a* and an ohmic contact layer 823*b*.

A gate insulating layer 720 is formed over the gate electrode 815, and the protective layer 740 is formed over the first and second electrodes 833 and 835. The protective layer 740 includes a contact hole 843 through which the second electrode 835 is exposed.

A pixel electrode 870 is formed on the protective layer 740. The pixel electrode 870 is connected to the second electrode 835 through the contact hole 843.

For example, the pixel electrodes 870 may be disposed in the same layer as the driving electrodes 110'.

The common electrodes 810 may be disposed on the first substrate 610. In FIG. 8, it is illustrated that the common electrodes 810 are disposed below the pixel electrode 870. However, the common electrodes 810 may be disposed above the pixel electrodes 870 or disposed in the same layer as the pixel electrodes 870.

An image display operation of the liquid crystal display 600 having the above-described structure will be briefly described as follows.

First, if a gate signal is applied to the gate electrode 815 of the pixel transistor TFT provided in each pixel, the active layer 823*a* is activated, and accordingly, the first electrode 833 transmits, to the second electrode 835 spaced apart therefrom at a predetermined distance, a data signal applied from a data line (not shown) connected thereto, through the active layer 823*a* formed thereunder.

In this case, the second electrode 835 is electrically connected to the pixel electrode 870 through the contact hole 843, and therefore, a voltage of the data signal is applied to the pixel electrode 870.

Accordingly, the arrangement of liquid crystal molecules in the liquid crystal layer 700 is adjusted corresponding to a voltage corresponding to the difference between the voltage applied to the pixel electrode 870 and the voltage applied to the common electrode 810, thereby displaying a predetermined image.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:
1. A touch sensor comprising:
a plurality of driving electrodes;
a plurality of sensing electrodes intersecting the driving electrodes;

a plurality of discrete piezoelectric materials disposed between the driving electrodes and the sensing electrodes at intersection points of the driving electrodes and the sensing electrodes; and a touch controller configured to detect a touch position and a touch pressure by using sensing signals output from the sensing electrodes, wherein the touch controller includes:

a touch position detector configured to detect the touch position by using alternating current (AC) components of the sensing signals, a touch pressure detector configured to detect the touch pressure by using direct current (DC) components of the sensing signals, and a plurality of AC bypass capacitors disposed between the sensing electrodes and the touch position detector, the plurality of AC bypass capacitors selectively transmitting the AC components of the sensing signals to the touch position detector.

2. The touch sensor of claim 1, wherein the touch pressure detector includes:

an analog-digital converter (ADC) receiving the DC components of the sensing signal and configured to convert the DC components of the sensing signals into digital data; and a converting unit connected to the ADC and configured to convert the digital data output from the ADC into touch pressure information.

3. The touch sensor of claim 2, wherein the plurality of discrete piezoelectric materials are disposed on a plurality of column spacers, respectively.

4. The touch sensor of claim 3, wherein the plurality of discrete piezoelectric materials and the plurality of column spacers are completely overlap in a plan view.

5. The touch sensor of claim 1, wherein the touch pressure detector includes:

an analog-digital converter (ADC) receiving the DC components of the sensing signal and configured to convert the DC components of the sensing signals into digital data; and a converting unit connected to the ADC and configured to convert the digital data output from the ADC into touch pressure information.

6. The touch sensor of claim 1, wherein the touch controller further includes a driving signal supply unit configured to supply driving signals to the driving electrodes.

7. The touch sensor of claim 1, wherein the plurality of discrete piezoelectric materials are disposed on a plurality of column spacers, respectively.

8. The touch sensor of claim 4, wherein the plurality of discrete piezoelectric materials and the plurality of column spacers are completely overlap in a plan view.

9. A liquid crystal display, comprising: a first substrate and a second substrate opposite to each other; a plurality of driving electrodes formed on the first substrate; a black matrix formed under the second substrate; a plurality of column spacers disposed under the black matrix, the plurality of column spacers extending toward the first substrate; a plurality of sensing electrodes formed over the column spacers and the black matrix, the plurality of sensing electrodes intersecting the driving electrodes; plurality of discrete piezoelectric materials disposed between the driving electrodes and the sensing electrodes at intersection points of the driving electrodes and the sensing electrodes; and a touch controller configured to detect a touch position and a touch pressure by using sensing signals output from the sensing electrodes, wherein the touch controller includes:

a touch position detector configured to detect the touch position by using AC components of the sensing signals; and a touch pressure detector configured to detect the touch pressure by using DC components of the sensing signals, and a plurality of AC bypass capacitors disposed between the sensing electrodes and the touch position detector, the plurality of AC bypass capacitors selectively transmitting the AC components of the sensing signals to the touch position detector.

10. The liquid crystal display of claim 9, wherein the plurality of driving electrodes overlap the black matrix.

11. The liquid crystal display of claim 9, further comprising a liquid crystal layer disposed between the first substrate and the second substrate.

12. The liquid crystal display of claim 9, wherein the touch pressure detector includes:

an ADC receiving the DC components of the sensing signal and configured to convert the DC components of the sensing signals into digital data; and a converting unit connected to the ADC and configured to convert the digital data output from the ADC into touch pressure information.

13. The liquid crystal display of claim 9, wherein the touch controller further includes a driving signal supply unit configured to supply driving signals to the driving electrodes.

14. The liquid crystal display of claim 9, wherein the plurality of discrete piezoelectric materials are disposed on the plurality of column spacers, respectively.

15. The liquid crystal display of claim 14, wherein the plurality of discrete piezoelectric materials completely overlaps with the plurality of column spacers in a plan view.

* * * * *